J. KIDDER.
MAGNETIC-MACHINE.

No. 175,111. Patented March 21, 1876.

WITNESSES:
A. W. Almqvist
John Goethals

INVENTOR:
J. Kidder
BY
ATTORNEYS.

UNITED STATES PATENT OFFICE.

JEROME KIDDER, OF NEW YORK, N. Y.

IMPROVEMENT IN MAGNETIC MACHINES.

Specification forming part of Letters Patent No. 175,111, dated March 21, 1876; application filed February 28, 1876.

*To all whom it may concern:*

Be it known that I, JEROME KIDDER, of the city, county, and State of New York, have invented a new and Improved Electrical Current, opening and closing, of which the following is a specification:

The object of my invention is to provide for an electrical operator a very convenient means of closing and opening the circuit of an electrical coil with a galvanic battery to facilitate its use.

My invention consists in hinging the support of an electrical coil in its relation to a galvanic battery in such a manner that when the coil is turned or swung in one direction the circuit will be closed with the galvanic battery, and when swung in the other direction the said circuit will be opened.

Figure 1:
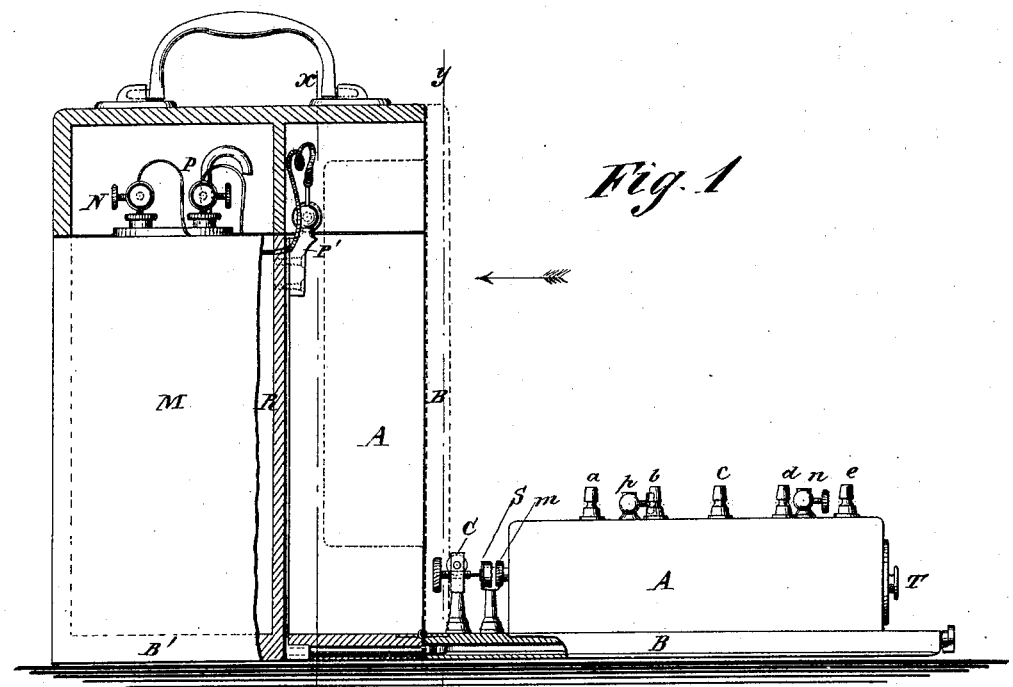
Figure 2:
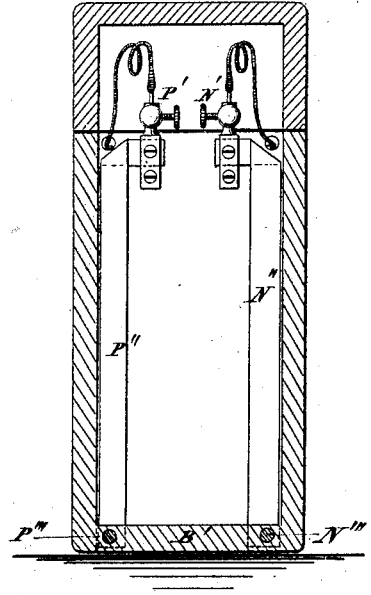
Figure 3:
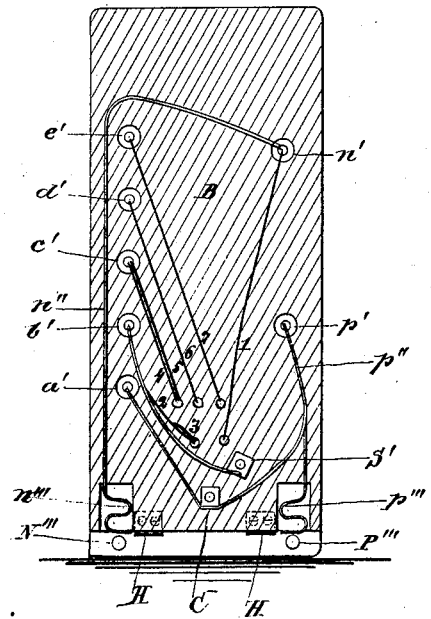

In the accompanying drawing, Figure 1 represents my improved electrical apparatus, partly in side view and partly in sectional elevation; Fig. 2, a section on line $x\,x$ of Fig. 1; and Fig. 3 represents a section on line $y\,y$ of Fig. 1.

In Fig. 1, M is the case containing the operative parts. N is the positive and P the negative pole of a galvanic cell used to operate the coils. R is a transverse upright partition, shown in Fig. 1, where a portion of the outside case is cut away. To the upper part of the partition R are joined the screw-cups P' N', Fig. 2, and to these are connected the copper strips P'' N'', Fig. 2, and these are connected, P'' to the metallic pin P''', and N'' to the metallic pin N''', both of which latter are inserted into the bottom B' of the box M, one at the end on either side. A, Fig. 1, is the box which contains the compound helix, which box is attached to the stand B. The latter is in two parts, the place of division being on line $y\,y$, Fig. 1. When not in use, this stand B is upright, forming an end of the case M. The wires 1 2 3 4 5 6 7 are the ends of the coils, constituting the compound helix made on Dr. Kidder's plan, described in his Patent No. 6,840, reissue. The helix may be of any other suitable form or kind, or constructed in any suitable manner, and a special description here is not pertinent. In this apparatus these coils are so combined that the metallic posts $a'\,b'\,c'\,d'\,e'$, Fig. 3, whose upper ends are shown at $a\,b\,c\,d\,e$, Fig. 1, to which they are attached, represent poles of the several combinations. The screw-cups $p\,n$, Fig. 1, are to be used only when it is desired to connect the helix with any battery whatever, as when, from any occasion, it might be desirable to remove the helix from the box M. The lower ends of the posts $p\,n$ are seen at $p'\,n'$. To $p'$ is attached the wire $p''$, and to $n'$ is attached the wire $n''$. To $p''$ is attached the metallic spring $p'''$, and to $n''$ is attached the metallic spring $n'''$. When the stand B is turned down to a horizontal position these springs $p'''$ and $n'''$ come in contact with the pins P''' N''', and thus it will be seen that the battery is in connection with the coils to operate them. The metallic post C, Fig. 1, bears a platinum-pointed screw touching a platinum disk on the spring, supported by the metallic post S, with a soft-iron hammer opposite the soft-iron core $m$, to cause automatic interruptions of the primary currents in the well-known manner, thus developing secondary currents in the several coils. When the helix is turned to a perpendicular position the circuit of the battery is open; but when the helix is turned down horizontally the battery-circuit is closed to operate the machine.

Having thus described my invention, what I claim as new, and desire to secure by Letters Patent, is—

The coil-support B, hinged to the box, and the conductors of the box and coil-support arranged in such relation that the circuit is closed and opened by the opening and closing of the box, substantially as set forth.

JEROME KIDDER, M. D.

Witnesses:
 T. B. MOSHER,
 ALEX. F. ROBERTS.